Dec. 30, 1969  R. G. TOWLERTON ET AL  3,487,434
NUTRITIONAL COMPOSITIONS FOR PIGLETS
Filed April 11, 1968
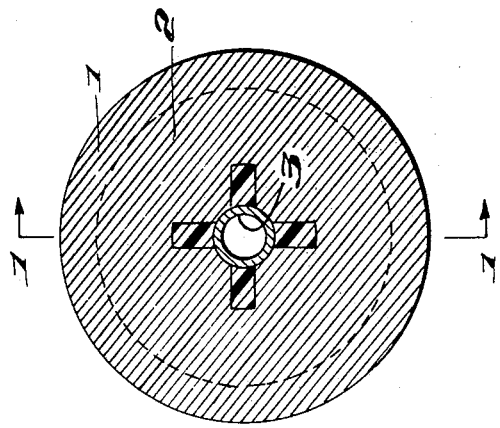
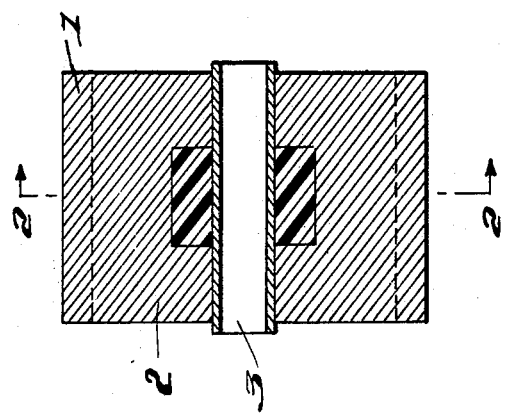
INVENTORS
RICHARD GEORGE TOWLERTON,
JOHN GILBERT LORD,
BY *Stephens, Huettig & O'Connell*
ATTORNEYS

United States Patent Office 3,487,434
Patented Dec. 30, 1969

3,487,434
NUTRITIONAL COMPOSITIONS FOR PIGLETS
Richard George Towlerton and John Gilbert Lord, Nottingham, England, assignors to Boots Pure Drug Company Limited, Nottingham, England, a British company
Filed Apr. 11, 1968, Ser. No. 720,655
Claims priority, application Great Britain, June 13, 1967, 27,290/67
Int. Cl. A01k 5/00; A23k 1/00
U.S. Cl. 119—51                    10 Claims

ABSTRACT OF THE DISCLOSURE

An iron lick for piglets is made of material palatable to piglets and has a hard portion and a soft portion each containing assimilable iron, the soft portion forming at least part of the external surface of the block.

---

The present invention relates to solid nutritional supplements for animals. More particularly, the invention concerns a nutritional supplement lick for piglets containing assimilable iron, for the prevention of iron-deficiency anaemia.

Solid feed supplements for animals are often provided in the form of blocks composed of edible material that is palatable to the animal concerned and that contains one or more substances beneficial to the growth and/or health of the animal, e.g. vitamins, minerals, and growth stimulants. These blocks are termed licks and are placed where animals can lick and/or gnaw them and thereby ingest the constituents of the lick.

In piglet rearing, iron-deficiency anaemia is a serious problem during the early part of the piglets' lives prior to weaning, and in order to inhibit the development of anaemia an assimilable form of iron is generally administered to the piglets, generally by oral administration of tablets, pills or pastes or by subcutaneous or intramuscular injection. However these methods are known to possess disadvantages. For example, the methods involve individual handling of the piglets which causes stress to the piglets and is also labour-consuming, especially in the case of the oral administration of tablets, pills, or pastes where repeated dosing of each piglet by hand is necessary. Injections also involve the risk of infection at the injection site especially when, as is often the case, the injections are carried out by farm workers. In addition, injections may cause permanent discolouration at the injection site which adversely affects the quality of the ham.

Assimilable iron for piglets can be made into a lick and it would be highly desirable if the piglets could be relied upon to lick or gnaw such a lick sufficiently to ingest the iron they need, since this method of administration avoids the disadvantages or individual handling and the risks of injection.

Licks for piglets consisting of blocks of material palatable to piglets and containing assimilable iron (hereinafter termed "iron licks") have previously been described, but such licks have been found to be inadequate, as very young piglets, for example those aged 2 to 8 days, especially 2 to 5 days, show insufficient interest in the licks. Thus, for example, the use of iron licks has been described in which iron licks have been made available to piglets at the age of 10 to 14 days, the piglets having received ferrous sulphate orally for the first 10 days of life.

It is an object of the present invention to provide an iron lick for piglets which may be consumed by very young suckling piglets, for example those aged 2 to 8 days, in sufficient quantity to provide their requirements of assimilable iron, in order to prevent the development of iron-deficiency anaemia.

According to one feature of the present invention there is provided an iron lick for piglets suitable for use in the hereinbefore described device consisting of a block of material that is palatable to piglets, the block comprising a hard portion and a soft portion each containing assimilable iron, the soft portion forming at least part of the external surface of the block. The block may comprise one or more hard portions and one or more soft portions. The soft portion may comprise the whole of the external surface of the block.

The soft portion is readily abraded and may be gnawed by piglets aged 2 to 5 days. The hard portion is resistant to abrasion but may be gnawed by older piglets, for example those aged 6 to 10 days and above. It will be appreciated that the hard portion of the block should have a degree of resistance to abrasion such that the hard portion will not be consumed too rapidly by the older piglets. The hard portion should also have sufficient mechanical strength to prevent cracking or breaking during use. By the term "assimilable iron" is meant a source of metabolizable iron orally acceptable to piglets, for example an iron salt orally acceptable to piglets or reduced iron.

The iron licks of the present invention may take a variety of forms. For example the block may comprise a cube having one or more soft faces. Another example is a cylindrical block comprising 3 coaxial portions joined at their bases, the outer end 2 portions being soft and the inner central portion hard.

Preferably however the iron lick blocks of the present invention compromise a hard core and a soft coating, the core and the coating containing assimilable iron.

The previously mentioned hard and soft portions of the piglet licks of the present invention are composed of material which comprises assimilable iron and a flavouring agent. An especially preferred flavouring agent is a sweetening agent. It will be appreciated that the material will also comprise a binding agent.

Suitable sweetening agents include (1) sugars, for example molasses, sucrose, glucose, lactose and fructose, and (2) synthetic sweetening agents, for example saccharin, saccharin salts, cyclamic acid and cyclamic acid salts. The sweetening agent used preferably comprises a sugar, especially sucrose. Mixtures of sweetening agents may be used. Molasses, which is commercially available as a syrup and as a spray-dried granular material, is a useful sweetening agent since it imparts a flavour that is particularly attractive to piglets. Other flavouring agents may be incorporated in the licks of the present invention, for example vanilla, by products from milk processing, and monosodium glutamate. Such flavouring agents are generally used in addition to sweetening agents.

Suitable binding agents include, for example, sucrose, lactose, molasses and edible gums such as acacia and tragacanth. It will be appreciated that one ingredient may function as both a sweetening agent and a binding agent. Sucrose, lactose and molasses are examples of such ingredients.

Suitable orally acceptable iron salts for use in the licks of the present invention include, for example, ferrous fumarate, ferrous gluconate, ferrous tartrate, ferrous sulphate, ferrous lactate, ferrous oxalate, ferric ammonium tartrate, ferric malate, soluble ferric phosphate, ferric tartrate, ferric succinate, and ferric potassium tartrate. Mixtures of iron salts may be used. A preferred iron salt is ferrous fumarate.

The hard and soft portions of the iron lick blocks of the present invention are suitably composed of material comprising 50–95% w./w., preferably 60–95% w./w., of an orally acceptable iron salt and 5–40% w./w., preferably 5–25% w./w., of sweetening agent.

The iron licks of the present invention may be prepared in various ways.

One method comprises forming a porous hard block and then dipping one or more surfaces of the block in a liquid which has a softening action on the block, thereby forming a block with one or more soft surface portions.

An aqueous liquid may be used in many cases to form a soft coating on a porous hard block. Preferably the aqueous liquid comprises an aqueous solution of an orally acceptable humectant, for example an orally acceptable polyol such as glycerol or sorbitol, including an orally acceptable glycol such as propylene glycol, hexylene glycol or a humectant polyethylene glycol, for example polyethylene glycol 400. This dipping method using a humectant is a particularly preferred method of making the blocks.

For example, a porous hard block comprising assimilable iron and a sugar such as sucrose as a binding agent may be dipped in an aqueous solution of an orally acceptable humectant, preferably glycerol. After allowing the block to soak for a sufficient time to achieve the desired penetration of aqueous solution, the block is removed, drained, and either allowed to equilibrate at ambient temperature or dried by heating at a suitable temperature, for example at 40–70° C., thereby producing a block comprising a hard core and a soft outer coating. Momentary dipping of the block in the aqueous solution is often adequate. The liquid used to soften the outer part of a porous hard block in this way may, if desired, contain flavouring agents, especially those with a sweet taste, for example molasses.

The porous hard block for use in the above described dipping process may be prepared by compression moulding techniques. After compression, it may be necessary to subject the moulded blocks to a heating stage in order to harden the blocks after moulding. For example a mixture of powdered iron salt and powdered sucrose may be moistened with water, compressed in a mould to produce a soft block of the required shape, and then heated at a suitable temperature, for example 40–70° C., in order to dry and harden the block.

The porous hard block for use in the above described dipping process may be prepared by compression moulding techniques similar to those used in tabletting. Thus, for example, a suitable mixture of assimilable iron, flavouring agent (especially a sweetening agent), binding agent and lubricant may be compressed by a punch in a suitable die. Before compression, the mixture may be in powder or granular form, or may comprise a mixture of granules and powder. Suitable lubricants are well-known in the art of tablet manufacture and include, for example, magnesium stearate, stearic acid and talc.

The iron licks of the present invention may also be prepared directly by compression moulding techniques, i.e. without involving a dipping stage. Such process may comprise filling a suitable mould with an inner composition and an outer composition, which, after compression and, if necessary, heat treatment, provide the hard core and the soft coating respectively. A suitable mould for such an operation is a cylindrical mould adapted for filling two compositions in annular relationship to each other. By means of such a mould it is possible to produce an iron lick according to the invention comprising a hard cylindrical core and a soft annular coating.

The direct formation of an iron lick according to the present invention by compression moulding may comprise the initial compression of a composition to form the core followed by a second compression step in which the core is covered with the desired soft coating. This coating may be formed from the same composition as that of the core, compressed to a lesser extent, but is generally prepared from a different composition adapted to provide a soft coating after compression.

The iron licks of the present invention may take the form of two-part blocks consisting of an inner core and an outer coating. However, the iron licks of the invention are not restricted to two-part licks and may consist of 3 or more parts. For example, the core may comprise 2 or more parts of different composition and/or different resistance to abrasion. Similarly 2 or more soft coatings may be provided.

For reasons of mechanical strength, the iron licks of the invention are generally suspended or otherwise mounted by means of their hard portion. For example, the licks may be formed with a hole through the hard portion by means of which the block may be suspended or otherwise mounted.

The iron licks of the invention may be fabricated in any desired shape. A cylindrical lick is prefered, preferably formed with an axial hole, i.e., a hole along the longitudinal axis of the cylinder, by which the lick may be mounted. Preferably the iron licks of the invention are mounted in a device as described in our U.S. patent application S.N. 720,656. To facilitate such mounting, the iron licks of the invention may be formed firmly attached to a hollow axial spindle, fabricated, for example, from a plastics material such as polyacetal, polyethylene, polypropylene or polyvinyl chloride.

Ferrous fumarate is a preferred form of assimilable iron for use in the iron licks of the invention. Preferably both the core and the coating of the iron licks comprise 70–95% w./w., especially 80–92% w./w., ferrous fumarate. A prefered block to be used in the hereinbefore described dipping process comprises 80–92% w./w. ferrous fumarate and 5–15% w./w. sucrose. The block preferably also comprises 2–6% w./w. molasses, and 0.5–3% w./w. of an edible gum, such as acacia and/or tragacanth.

A preferred aqueous solution for use in softening the outer portion of such a block comprises 10–50% w./w., especially 10–30% w./w. of a humectant such as those hereinbefore described and 5–30% w./w. of a sweetening agent. A preferred humectant is glycerol and preferred sweetening agents are sucrose and/or molasses.

In addition to the hereinbefore described ingredients, the iron licks of the invention may contain other ingredients beneficial to the well-being of piglets, for example minerals such as copper salts and cobalt salts, and vitamins such as vitamin B12 and ascorbic acid.

In use, the iron licks of the invention are placed in a position where the piglets, but not the sow, can reach the licks. Such a position is often situated in the railed-off area of a pig pen known as the "creep" area. Thus according to a further feature of the invention there is provided a method of preventing iron-deficiency anaemia in suckling piglets which comprises allowing the piglets, but not their sow, access to an iron lick as hereinbefore described.

We have surprisingly found that the iron licks of the invention are spontaneously and readily gnawed at by suckling piglets aged 2 to 5 days and above, as a result of which the blood haemoglobin levels of the piglets are maintained well above the anaemia level during the first two weeks of the piglets' lives, which is a time during which the piglets are very susceptible to iron-deficiency anaemia and its effects. A blood haemoglobin level of 7 g./100 ml. is generally accepted as the borderline between the anaemic and non-anaemic state in piglets, but a blood haemoglobin level above 8 g./100 ml. is highly desirable since it results in optimum growth and resistance to disease.

By means of the present invention it is possible to provide a litter of piglets with one iron lick which will provide their requirements of assimilable iron from birth until the piglets are capable of eating appreciable quantities of solid food, for example at age 3 to 5 weeks. No additional iron, for example a daily oral dosage of assimilable iron given by hand during the first week or 10 days of life, is required, which is a great advantage.

In the accompanying drawing:

FIG. 1 is an axial sectional view of a piglet lick block according to the invention and FIG. 2 is a sectional view of such block taken along the line 2—2 of FIG. 1 in the direction of the arrows.

Referring to such drawings, the piglet lick block is composed of the hollow axial spindle 3, carrying the hard core 2 of the piglet lick composition, which in turn is covered with layer 1 of softer piglet lick composition.

The following non-limitative examples illustrate the invention.

EXAMPLE 1

Cylindrical iron licks were prepared from the following ingredients:

|  | Kg. |
|---|---|
| Ferrous fumarate (powder) | 33.6 |
| Sucrose powder (icing sugar) | 4.0 |
| Molasses (syrup) | 22.0 |
| Gum acacia | 0.4 |
| Gum tragacanth | 0.04 |
| Water | 1.6 |

The ingredients, apart from the molasses, were thoroughly mixed. To the stirred mixture was slowly added the molasses dissolved in 800 ml. water, followed by the rest of the water. The damp mixture was immediately compressed in cylindrical moulds of diameter 5.2 cm. using 100 g. damp mixture per mould, at a pressure of about 3–4 kg./cm.$^2$ to a thickness of 3.1 cm.

The damp mixture was compressed in each mould around a hollow axial spindle moulded from polypropylene. Each spindle was 3.5 cm. long, with an external diameter of 9 mm. and a smooth bore of diameter 0.46 cm. Each spindle had 4 symmetrical radial spigots extending 0.5 cm. from the outer circumference of the spindle, half way along its length. The resulting blocks were then dried in an oven at 60° C. to give 360 cylindrical blocks (blocks A) of weight 94–95 g. and dimensions length 2.8–3.0 cm., diameter 5.2–5.3 cm. mounted on axial spindles.

Some of these blocks were momentarily dipped into a solution of molasses (syrup) and glycerol in water, the solution containing 10% w./w. molasses and 15% w./w. glycerol. After dipping, the blocks were dried for 1 hour at 60° C., to give blocks with a cohesive, soft outer layer of depth 0.2–0.3 cm. (blocks B).

In comparative trials, blocks A and blocks B were pivotally mounted in pig pens by means of the device shown in FIGURES 1–3 of the aforementioned U.S. application filed of an even date herewith, except that the interior surface of the axial spindle was smooth and freely rotatable on an axle of diameter 0.44 cm. The axle was attached to an arm 7.5 cm. long pivotally connected to a plate fixed to a wall in the creep area of the pig pen so that the block, rotatably mounted on a horizontal axle, pivoted about a horizontal axis 14 cm. from the floor of the pen. Litters of suckling piglets with access to their sows were reared on blocks A or B, using 1 block per litter, provided when the piglets were 1 day old. Control piglets were also reared without any blocks.

Blocks B proved to be much more attractive to very young piglets than the undipped blocks A. The piglets started to lick and gnaw blocks B appreciably at age 2–3 days and appreciable quantities of the blocks were consumed between this age and age 6 days, and thereafter. The piglets did not start to lick and gnaw at blocks A appreciably until they were 6 days old.

Blood haemoglobin levels of the piglets were determined at ages 10 and 21 days, with the following results.

(Hb% denotes the mean blood haemoglobin levels in g./100 ml. These mean values are given ± the standard error.)

| Block | None control | A (undipped) | B (dipped) |
|---|---|---|---|
| Hb% at 10 days | 7.1±0.22 | 8.6±0.152 | [1] 9.7±0.135 |
| No. of piglets | 50 | 115 | 90 |
| Hb% at 21 days | 6.2±0.23 | 10.9±0.225 | 10.7±0.086 |
| No. of piglets | 50 | 114 | 435 |

[1] This result is significantly higher than the mean for the undipped blocks A (p 0.001).

The results show that the control piglets were on the borderline of anaemia at 10 days and anaemic by 21 days. The haemoglobin levels of the piglets reared on blocks A were good at 10 days and excellent at 21 days. The haemoglobin levels of the piglets reared on blocks B were excellent at both 10 and 21 days, and demonstrate the superiority of blocks B in maintaining the blood haemoglobin levels of piglets well above the borderline value of 7 g./100 ml. during the critical first 3 weeks of their lives.

EXAMPLE 2

In a similar way to that described in Example 1, using the same moulds but no axial spindles, blocks of similar dimensions and weight were prepared from the following ingredients:

|  | Gm. |
|---|---|
| Ferrous fumarate (powder) | 690 |
| Sucrose powder (icing sugar) | 150 |
| Corn starch | 130 |
| Molasses (syrup) | 20 |
| Gum acacia | 10 |
| Gum tragacanth | 1 |
| Water | 150 |

Before drying at 60° C., axial holes were bored in the blocks.

The blocks weighed 91.94 g. and had dimensions: length 3.2–3.4, cm., diameter 5.2–5.3 cm., with an axial hole of diameter 0.6 cm.

9 blocks (blocks C) were prepared. 5 of these were treated as described in Example 1 to form blocks (blocks D) having a soft coating. Blocks C and D were pivotally mounted and made accessible to suckling piglets 1 day old as described in Example 1, except that each block was mounted by means of its axial hole instead of an axial spindle. Piglets started to lick and gnaw blocks D appreciably at age 2–3 days, whereas blocks C were not licked to any appreciable extent until the piglets were 6 days old. A litter of piglets reared on a block C had mean blood haemoglobin levels at ages 10 and 21 days respectively of 7.4 and 8.4 g./100 ml., whereas the corresponding values for block D were 8.2 and 10.2 g./100 ml.

EXAMPLE 3

Damp compositions (1) and (2) were prepared from the following ingredients:

|  | Grams | |
|---|---|---|
|  | (1) | (2) |
| Ferrous fumarate (powder) | 810 | 840 |
| Sucrose powder (icing sugar) | 86 | 100 |
| Molasses (syrup) | 120 | 50 |
| Gum acacia | 10 | 10 |
| Gum tragacanth | 0 | 1 |
| Water | 30 | 40 |

The damp compositions were prepared as described in Example 1. Using a removable tube of diameter 3.8 cm., 50 g. of the damp composition (2) was filled into the centre of a cylindrical mould of diameter 5.2 cm., and 50 g. of the damp composition (1) was filled into the outer annular space. The tube was removed and the mixture compressed at a pressure of 3–4 kg./cm.² to a thickness of 3.1 cm. Axial holes were bored into the blocks and the blocks were dried at 60° C., to give 9 blocks of weight 94–95 g. with overall dimensions, length 2.8–3.0 cm., diameter 5.2–5.3 cm., with an axial hole of diameter 0.6 cm. The cylindrical blocks had an inner hard core of diameter 3.8 cm., and an outer annular soft coating of radial thickness 1.4–1.5 cm.

The blocks were pivotally mounted and made accessible to suckling piglets 1 day old as described in Example 1, except that each block was mounted by means of its axial hole instead of an axial spindle. Piglets started to lick and gnaw the blocks appreciably at age 2–3 days. A litter of piglets reared on a block had mean blood haemoglobin g./100 ml.

EXAMPLE 4

In a similar way to that described in Example 3, but using 15 parts damp composition (1) to 85 parts damp composition (2), blocks were prepared having an annular soft coating of 2 mm. radial thickness. The dimensions of the blocks were length 2.8–3.0 cm., overall diameter 5.2–5.3 cm., with an axial hole of diameter 0.6 cm.

We claim:

1. An consumable iron lick for piglets consisting of a block of material palatable to piglets, the block comprising a hard portion and a soft portion each containing assimilable iron, the soft portion forming at least part of the external surface of the block.

2. An iron lick according to claim 1 in which the block comprises a hard core and a soft coating, the core and the coating containing assimilable iron.

3. An iron lick according to claim 2 in which the hard and soft portions of the block contain a sweetening agent.

4. An iron lick according to claim 3 in which the sweetening agent comprises a sugar.

5. An iron lick according to claim 4 in which the assimilable iron comprises ferrous fumarate.

6. An iron lick according to claim 5 which comprises 80–92% w./w. ferrous fumarate and 5–15% w./w. sucrose.

7. An iron lick according to claim 3 in which the block is cylindrical with an axial hole.

8. A process for preparing an iron lick for piglets which comprises dipping a porous hard block of material palatable to piglets comprising assimilable iron and a sugar in an aqueous solution containing an orally acceptable humectant in order to form a soft coating on the block.

9. A process according to claim 8 in which the humectant comprises glycerol.

10. A method of preventing iron-deficiency anaemia in suckling piglets which comprises allowing the piglets, but not their sow, access to an iron lick consisting of a block of material palatable to piglets, the block comprising a hard portion and a soft portion each containing assimilable iron, the soft portion forming at least part of the external surface of the block.

References Cited

UNITED STATES PATENTS

| | | | |
|---|---|---|---|
| 1,009,361 | 11/1911 | Weil | 119—51 |
| 2,758,566 | 8/1956 | Talbott | 119—51 |
| 3,175,536 | 3/1965 | Hilaire | 119—51 |

ALDRICH F. MEDBERY, Primary Examiner

U.S. Cl. X.R.

99—2